United States Patent [19]

Hammond

[11] Patent Number: 5,525,250
[45] Date of Patent: Jun. 11, 1996

[54] THERMAL ENERGY STORAGE COMPOSITION TO PROVIDE HEATING AND COOLING CAPABILITIES

[75] Inventor: Michael J. Hammond, Indianapolis, Ind.

[73] Assignee: Store Heat and Produce Energy, Inc., Indianapolis, Ind.

[21] Appl. No.: 342,112

[22] Filed: Nov. 18, 1994

[51] Int. Cl.$^6$ .................................................. C09K 5/06
[52] U.S. Cl. .............................. 252/70; 252/71; 252/73; 62/71; 62/347
[58] Field of Search ........................ 252/70, 71, 73; 62/71, 347

[56] References Cited

U.S. PATENT DOCUMENTS

| | | | |
|---|---|---|---|
| 3,986,969 | 10/1976 | Telkes | 252/70 |
| 4,100,092 | 7/1978 | Spauschus et al. | 252/70 |
| 4,189,394 | 2/1980 | Schröder et al. | 252/70 |
| 4,303,541 | 12/1981 | Wasel–Nielen et al. | 252/70 |
| 4,332,690 | 6/1982 | Kimura et al. | 252/70 |
| 4,392,971 | 7/1983 | Kimura et al. | 252/70 |
| 4,397,752 | 8/1983 | Kimura et al. | 252/70 |
| 4,431,558 | 2/1984 | Wada et al. | 252/70 |
| 4,447,347 | 5/1984 | Goldfarb et al. | 252/70 |
| 4,465,611 | 8/1984 | Yanadori et al. | 252/70 |
| 4,491,529 | 1/1985 | Piel et al. | 252/70 |
| 4,509,344 | 4/1985 | Ludwigsen et al. | 62/76 |
| 4,540,502 | 9/1985 | Kimura | 252/70 |
| 4,585,573 | 4/1986 | Yanadori et al. | 252/70 |
| 4,645,612 | 2/1987 | della Faille d'Huysse et al. | 252/70 |
| 4,671,077 | 6/1987 | Paradis | 62/324.1 |
| 4,978,469 | 12/1990 | Seaman, Jr. | 252/70 |
| 5,037,571 | 8/1991 | Ames | 52/70 |
| 5,402,650 | 3/1995 | Stewart, Jr. | 62/71 |

OTHER PUBLICATIONS

York IceBalls™ Thermal Storage System product information brochure (Form 175.03 G1(191)). 1990.

*Primary Examiner*—Melissa Bonner
*Attorney, Agent, or Firm*—Barnes & Thornburg

[57] ABSTRACT

The present invention relates to a thermal energy storage composition and a method for reducing rupture failures during freezing cycles of container device phase change material. The phase change composition contains about 60 to about 91 weight percent water and about 9 to about 40 weight percent of one or a mixture of water-dispersible non-ionic surfactants, particularly alcohol ethoxylates.

13 Claims, 5 Drawing Sheets

THERMAL ENERGY STORAGE COMPOSITION TO PROVIDE HEATING AND COOLING CAPABILITIES

BACKGROUND AND SUMMARY OF THE INVENTION

The present invention relates to thermal energy storage formulations. More particularly, the present invention relates to an improved water-based thermal energy storage formulation which disrupts ice structure and reduces volume expansion associated with the transformation of water to ice.

Phase change materials ("PCMs") store heat during phase transition, typically liquid/solid phase transitions. A large amount of thermal energy can be stored as latent heat of fusion during the melting of the PCM. For this reason, PCMs are often incorporated into thermal energy storage apparatuses. During the operation of such an apparatus, heat from the surrounding air is transferred to the PCM as heat of transition, until the frozen PCM completely melts. Additional heat from the surrounding air is then stored within the PCM as sensible heat. The heat stored within the PCM may be discharged from the apparatus by passing relatively cool air past the liquid PCM. The liquid PCM transfers its heat to the air stream, and thus, the temperature of the air stream is raised and the PCM is re-cooled.

Various attempts have been made to incorporate PCMs into heating and air conditioning systems, including heat pump systems, solar collection systems, and more conventional heating and air conditioning systems for homes, vehicles, and similar structures requiring heating and cooling. For example, U.S. Pat. No. 5,054,540 to Carr describes a cool storage reservoir positioned in an air duct of a vehicle on the like. Another example is the "heat battery" designed to provide "instant heating" to a vehicle cabin. (Automotive Engineering, Vol. 100, No. 2, February, 1992.)

A variety of materials may be used as PCMs. For example, water, paraffins, alcohols, and salt hydrates have notably high energy densities over temperature ranges of practical significance. Water, however, is of particular interest because it is plentiful, inexpensive, and environmentally friendly. As a heat storage material, it has good heat capacity, heat transfer properties, and an acceptable density. Additionally, the transformation of water into ice has a heat of fusion of 80 cal/g and occurs at 0° C.

However, the use of water as a PCM presents some difficulties. For example, conventional air conditioning units must be reconfigured to operate at the ice temperature, and, in an air heat exchanger, moisture can freeze on the cooling coil. In addition to refrigeration considerations, the conversion of water to ice is accompanied by approximately a 9% volume expansion. This anomalous expansion during freezing is the cause of busted water pipes in homes during cold weather, and broken radiators/cracked engine blocks in cars. Moreover, if freezing water were to crack a thermal storage apparatus, causing liquid PCM to leak, a user relying on the PCM for climate control would be put at an unnecessary risk of exposure to extreme cold or heat. What is needed is a formulation for a PCM, which has the energy storage qualities of water but lacks the destructive freeze characteristics associated with water's transformation to ice.

According to the present invention, there is provided a method for reducing rupture failures during freezing cycles of a container device holding in a PCM composition comprising about 60 to 91 weight percent water by adding to the composition one or a mixture of non-ionic surfactants, preferably ethoxylates.

Also in accordance with the present invention there is provided a water-based thermal energy storage formulation capable of forming a frozen discontinuous water phase and of significantly maintaining the energy storage properties of water. The composition comprises about 60 to about 91 weight percent water and about 9 to about 40 weight percent of one or a mixture of water-dispersible non-ionic surfactants.

The project was undertaken to modify the freeze characteristics of water, specifically the single piece characteristic of ice and the considerable freeze expansion. The objective was to have ice form as discrete particles, forming a kind of "slippery ice" and/or to reduce the total expansion accompanying ice formation. The composition in accordance with the present invention prevents the formation of a single, solid, block of ice and reduces freeze expansion.

Additional objects, features, and advantages of the invention will become apparent to those skilled in the art upon consideration of the following detailed description of the preferred embodiments exemplifying the best mode of carrying out the invention as presently perceived.

BRIEF DESCRIPTION OF THE DRAWINGS

The detailed description particularly refers to the accompanying figures in which.

DETAILED DESCRIPTION OF THE INVENTION

In accordance with the present invention there is provided a method for reducing rupture failures during the freezing of container devices holding water-based phase change materials—a problem that has been particularly noted with respect to thermal storage apparatuses. It has been found that when a non-ionic surfactant, preferably one or a mixture of ethoxylates, is used in combination with water, the formulation is capable of forming a frozen discontinuous water layer while maintaining the energy storage properties of water. In addition, volume expansion which accompanies the water to ice transformation is reduced with little if any depression in the freezing point.

The presence of non-ionic surfactant in water changes the physical characteristics of the resulting frozen mass from that of ice. Water, in the absence of a non-ionic surfactant, expands as it freezes and forms as a solid block of ice, without any indication of discrete crystals. Additionally, the water solidifies from the outside of the system toward the center core. Thus, when the center core freezes, it expands as it pushes against the already solid ice block surrounding freezing core. The direction of the expansion depends upon the strength of the surroundings and will follow the path of least resistance. If that path is breaking the container which holds the freezing water, that is the path the expansion will take, despite the existence of available head space above the rather flat surface of the ice.

Figure 1:
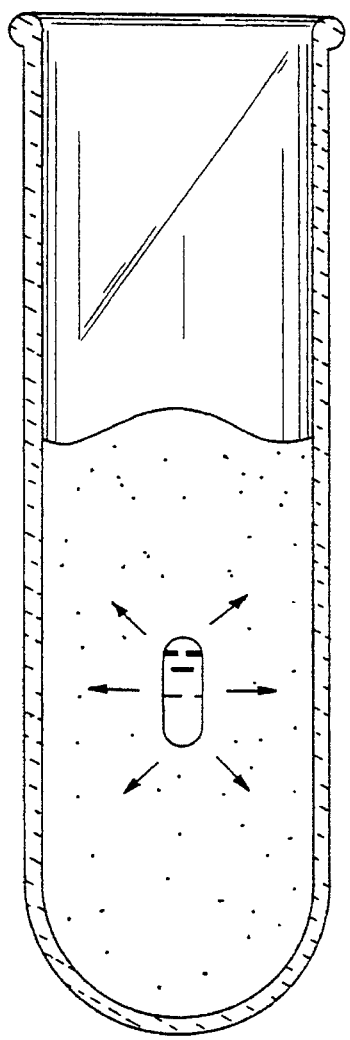
FIG. 1 is a view of a test tube containing a non-ionic surfactant/water solution in accordance with the present invention and showing a center core pressing up through an already frozen surface into available space above the surface.

It has been found that when non-ionic surfactants are added to the water-based phase change material (PCM), a somewhat "slippery" ice is formed. This "slippery" ice is believed to consist of discrete particles surrounded by a layer of solidified hydrated surfactant phase. The particles do not interlock, but rather move individually within the solidified mass. So, as the center core of the PCM freezes, any expansion in volume causes the surrounding particles to individually move away from the core. If there is available head space above the surface of the PCM, the particles will press up through the frozen surface and into that available space, see FIG. 1. Thus, the resulting frozen PCM often has the appearance of a domed surface. Given the movement of the individual particles, the water-based PCM can be frozen in a wide variety of inflexible commercially available containers without fear of breakage, so long as there is available head space to accommodate slight doming of the solid mass therein.

Therefore, there is also provided, as a preferred embodiment of the present invention, a PCM composition comprising about 60 to about 91 weight percent water and about 9 to about 40 weight percent of one or a mixture of non-ionic surfactant. The preferred compositions differ from present commercially available water-based PCM's particularly in that they utilize a non-ionic surfactant alone or in addition to standard art-accepted anionic surfactants. The anionic surfactant is added to the PCM composition to add heat stability to the solution during sensible heat storage. The water-based PCM compositions of the present invention can also include other optional ingredients such as defoamers and microbiocides to aid in formulation of the composition and to enhance customer acceptance of the product.

A suitable non-ionic surfactant for use in this invention is selected from one or a mixture of non-ionic surfactants. Non-ionic surfactants which may be formulated into the present invention include commercially available alcohol ethoxylates, including alkylphenolalkoxylates, polyoxyethylene derivatives of sorbitan fatty acid esters of lauric acid, palmitic acid, oleic acid, and stearic acid, block copolymers of propylene and ethylene oxides, glycerol fatty esters, polyoxyethylene esters and polyoxyethylene fatty acid amides. Typically, the composition includes water-dispersible, short chain, low molecular weight linear alcohol ethoxylates. Preferably, the alcohol ethoxylates are represented by the general formula R—O—(CH$_2$CH$_2$O)$_n$H where R is an alkyl radical having from 8 to about 16 carbon atoms and the number of ethoxylate groups, n, is from about 5 to about 8. Typical ethoxylate compositions comprise a mixture of a linear paraffin containing 8–16 carbon atoms and about 5 to about 8 ethoxy groups. Most preferably, the ethoxylate mixtures comprise C$_8$–C$_{12}$ alcohol ethoxylates having about 5 ethoxy groups attached. Commercially available non-ionic surfactants of this type are sold by Vista Chemical Company under the trade name Alfonic surfactants, with Alfonic 1012-5 being preferred for use herein. It is contemplated, however, that alcohol ethoxylates such as octylphenolethoxylates and nonylphenolethoxylates may be used herein.

The non-ionic surfactant is present in the composition from about 9 to about 40 weight present. Preferred weight percentages of the non-ionic surfactants are dependent upon the preferred characteristics of the PCM. To maximize the energy storage capability of the PCM, the composition typically includes from about 9 to about 30 weight percent non-ionic surfactants and most preferably about 9 weight percent non-ionic surfactants. The preferred composition for use in accordance with the present invention maximizes energy storage capability and includes about 9 weight percent non-ionic surfactants. If, however, the water-based PCM is to have substantial reduction in its freeze expansion, the composition typically includes from about 20 to about 40 weight percent non-ionic surfactants and most preferably about 40 weight percent non-ionic surfactants. Ideally, the water-based composition further includes an anionic surfactant present in the solution from about 0.5 weight percent to about 1.0 weight percent. It is noted that surfactants have minimal affect on sensible heat storage of the PCM. In fact, for every 10 weight percent of surfactant, there is only a corresponding decrease in sensible heat storage capacity of about 5 percent.

The anionic surfactants are preferably included in the PCM compositions of the present invention to prevent separation of the non-ionic surfactant and the water into organic and water phases at increased temperatures. The temperature of the PCM often rises to increased temperatures as it stores sensible heat. Without an anionic surfactant, separation of the layers occurs at about 35° C. to about 40° C., the cloud point of the solution. Preferably, with the addition of the anionic surfactant, the PCM composition is stable in a continuous single phase when heated past 90° C. Heat stability is often important for customer acceptance of the product when it is to be used to store sensible heat, because once the phases have separated into distinct layers, it is difficult and often impractical to re-mix them. For example, if the PCM were used in a vehicular application, it would likely be subjected to extreme heating conditions, well-above 35° C. to 45° C. Moreover, if the surfactant and water were to separate into layers, the agitation from driving along a highway would likely be insufficient to force the phases back into a single solution.

A wide variety of anionic surfactants suitable for use in the present invention include naphthalene sulfonates, sodium stearates, salts of a fatty acid, and surfactants having the formula R-COOM and R-OSO$_3$M, where M represents an alkali metal or ammonium and R represents an organic radical having more than 10 carbon atoms. Examples of suitable anionic surfactants are soaps, sodium lauryl sulfonate, alkyl naphthalene sulfonates, and sodium stearate. Preferably, the anionic surfactant is an alkyl naphthalene sulfonate. Commercially available anionic surfactants of this type are sold by Witco, Inc., under the trade name Petro surfactants, with Petro ULF being a preferred alkyl naphthalene sulfonate for use herein.

EXAMPLE 1

A water-based PCM was formulated in accordance with the present invention to include 10 weight percent non-ionic surfactant. The surfactant, Alfonic 1216CO-7.5 was added and dissolved in warm water. Warm water was preferred as it facilitated the dissolution of the ethoxylate. After the ethoxylate surfactant was solubilized, about 1 weight percent of Petro ULF (2 volume percent active), was added as a high temperature stabilizer.

Figure 2:
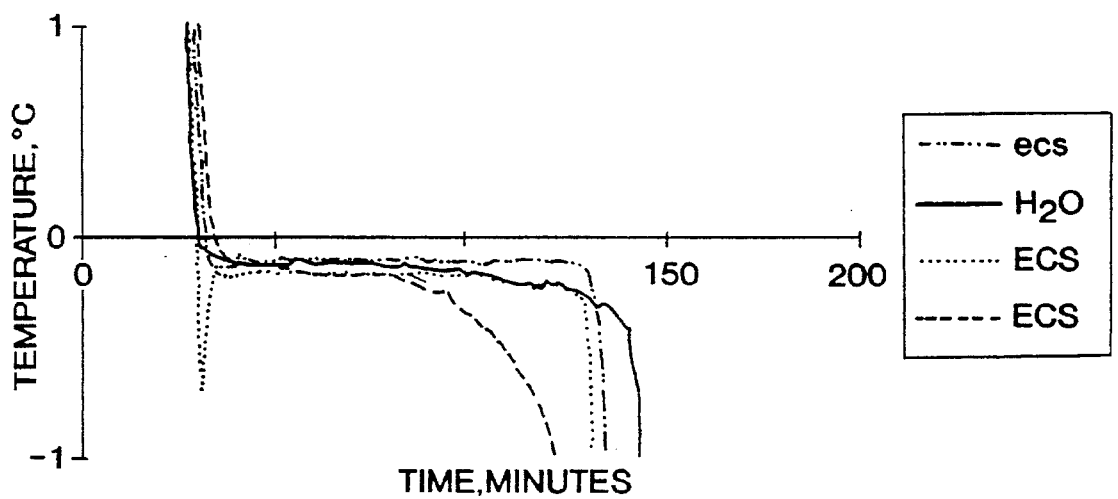
FIG. 2 is a plot of temperature versus time showing performance of a PCM in accordance with the present invention comprising 10 weight percent alcohol ethoxylates having a paraffin chain of 12 to 16 carbon atoms and about 7.5 ethoxylate groups, 1 weight percent anionic surfactant, and 89 weight percent water in accordance with the present invention.

The freeze characteristics of this water-based PCM solution are plotted in FIG. 2. As can be seen in the graph, the freeze temperature of the PCM composition in accordance with the present invention was essentially the same as that for water. Additionally, the freeze "plateau", indicative of the energy storage capabilities of the material, was similar to that of water. The time to freeze the PCM, however, was less than the time to freeze the equivalent weight of water. Unlike a saltwater system (see FIG. 3), freezing point depression and "tailing" at the end of the freeze were not observed.

Figure 6:
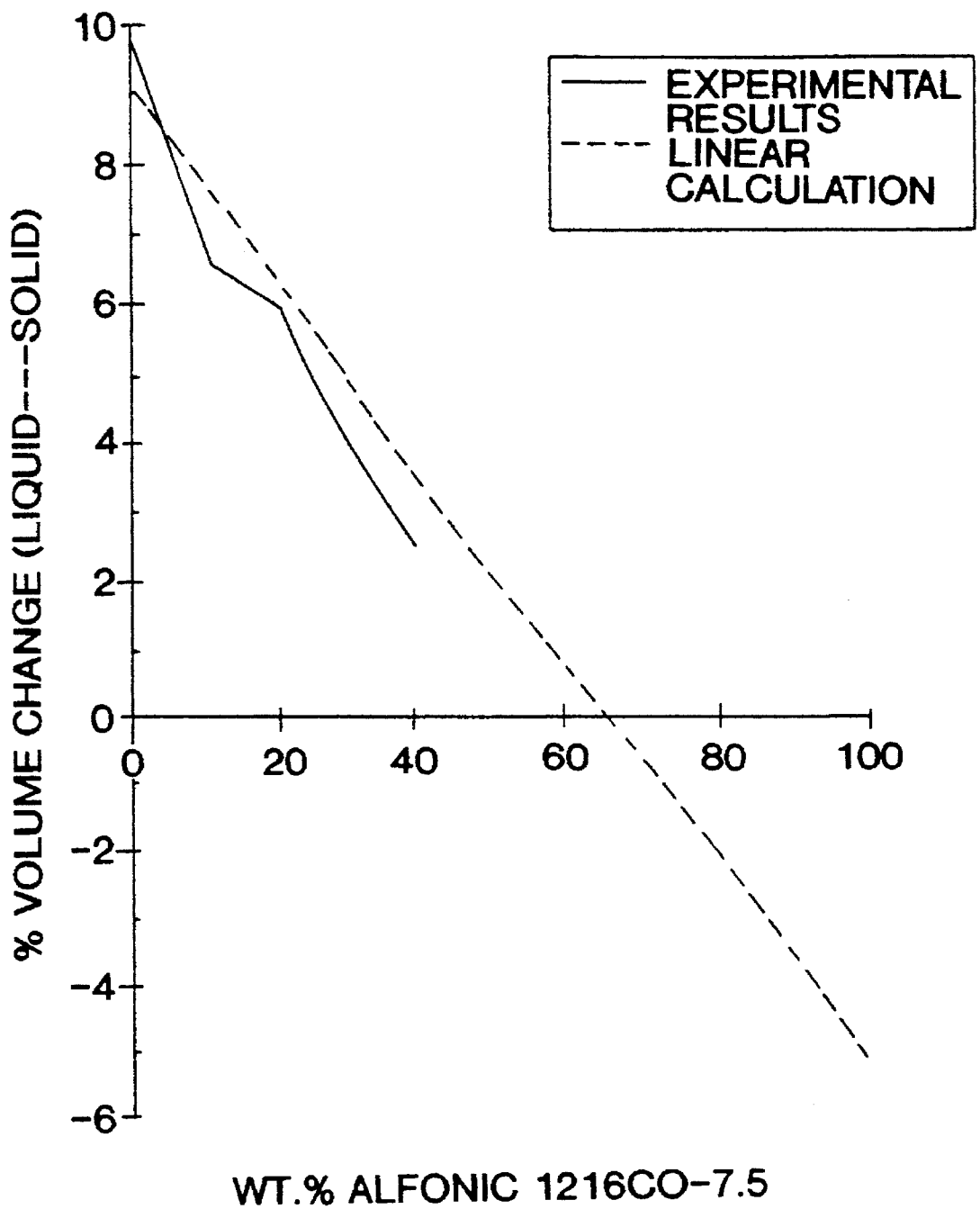
FIG. 6 is a plot of the freeze expansion versus weight percentage of $C_{12}$–$C_{16}$ alcohol ethoxylates having about 7.5 ethoxylate groups showing a decrease in freeze expansion as the weight percentage ethoxylates in the composition increases.

The Alfonic 1216CO-7.5/water system, when subjected to a freeze-thaw cycle formed a gelatinous layer on the surface, but no further evidence of segregation could be observed within the sample. As can be seen in FIG. 6, the freeze expansion of this system was measurably less than for pure water.

EXAMPLE 2

A water-based PCM was formulated to include 9 weight percent surfactant. The surfactant, Alfonic 1012-5, was dissolved with about 1 weight percent Petro ULF (about 2 volume percent active) in water and tested for cloud point. The cloud point of the solution was above 90° C. Upon 6 consecutive freeze-thaw cycles, segregation of the components was minimal. The composition successfully disrupts the ice structure of water during a freeze and thus is considered to be a preferred composition in accordance with the present invention.

EXAMPLE 3

Test solutions of PCMs were prepared in accordance with the protocol of Example 1 to evaluate the freezing point and the resulting freeze curve of the compositions.

| Compound(s) Added to Water | Weight % of Compound in PCM | Water Solubility | Freezing Point °C. Relative to Water | Freeze Curve See Figure |
|---|---|---|---|---|
| polyethylene glycol –300 (CW300) | 5% | yes | slight dep. | 3 |
|  | 10% | yes | –1 | — |
|  | 20% | yes | –3 | — |
| $MgCl_2.6H_2O$ | 9% | yes | –3—4 | 3 |
| Alcohol ethoxylate $R-O(CH_2CH_2O)_nH$ |  |  |  |  |
| $R = C_{12}-C_{16}$ alkyl | 5% | no | slight dep. | 3 |
| n = 2 | 20% | no | 0 |  |
| $R = C_{10}-C_{12}$ alkyl | 10% | yes | 0 | — |
| n = 5 | 20% | yes | slight dep. | — |
|  | 30% | yes | –1 | 4 |
| $R = C_8-C_{10}$ alkyl | 30% | — | –0.7 | 4 |
| n = 7–8 |  |  |  |  |
| (Novel II 810-7.5) |  |  |  |  |
| R = 12–16 alkyl | 30% | — | –0.1 | 4 |
| n = 7 |  |  |  |  |
| (Novel II 1216-7) |  |  |  |  |
| $R = C_{12}-C_{16}$ alkyl | 10% | yes | 0 | 5 |
| n = 7.5 | 20% | yes | slight dep. | 5 |
|  | 30% | yes | slight dep. | 5 |
|  | 40% | yes (gel) | –1.4 | 7 |

Figure 3:
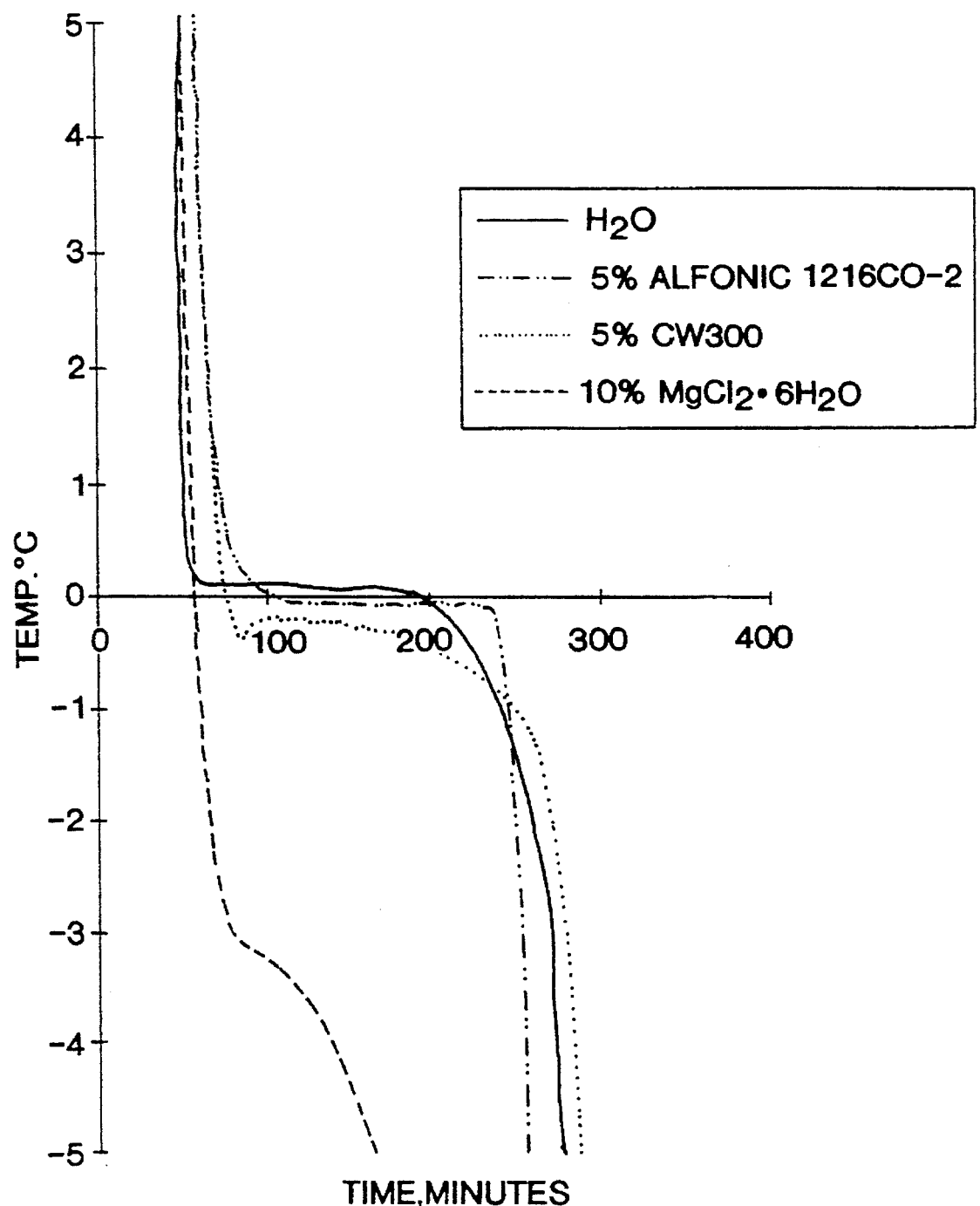
FIG. 3 is a plot of temperature versus time of a $MgCl_2.6H_2O$/water solution, polyethylene glycol/water solution, and a water-based PCM composition comprising a mixture of 5 weight percent $C_{12}$–$C_{16}$ alcohol ethoxylates having 2 ethoxy groups.

The freeze curve of the polyethylene glycol (PEG), $MgCl_2.6H_2O$, and Alfonic 1216CO-2 are illustrated in FIG. 3. Each of these compounds were dismissed as unworkable as a PCM, in accordance with the present invention. High levels of PEG would be necessary for adequate suppression of freeze expansion. At the same time, increasing levels of PEG caused intolerable depression of the freezing point. Secondly, the $MgCl_2.6H_2O$, depressed the freezing point to –3° to –4° C. which often exceeds the minimal default requirements for an air-conditioning system to generate the required amount of ice in the allotted time slot. Also, the use of chloride salts are bad from a corrosion standpoint in metal containers. Finally, the $C_{12}-C_{16}$ alcohol ethoxylate having 2 ethoxy groups is regarded as a surfactant precursor and is not soluble in water. The freeze tests demonstrated virtually no interaction with water.

Figure 4:
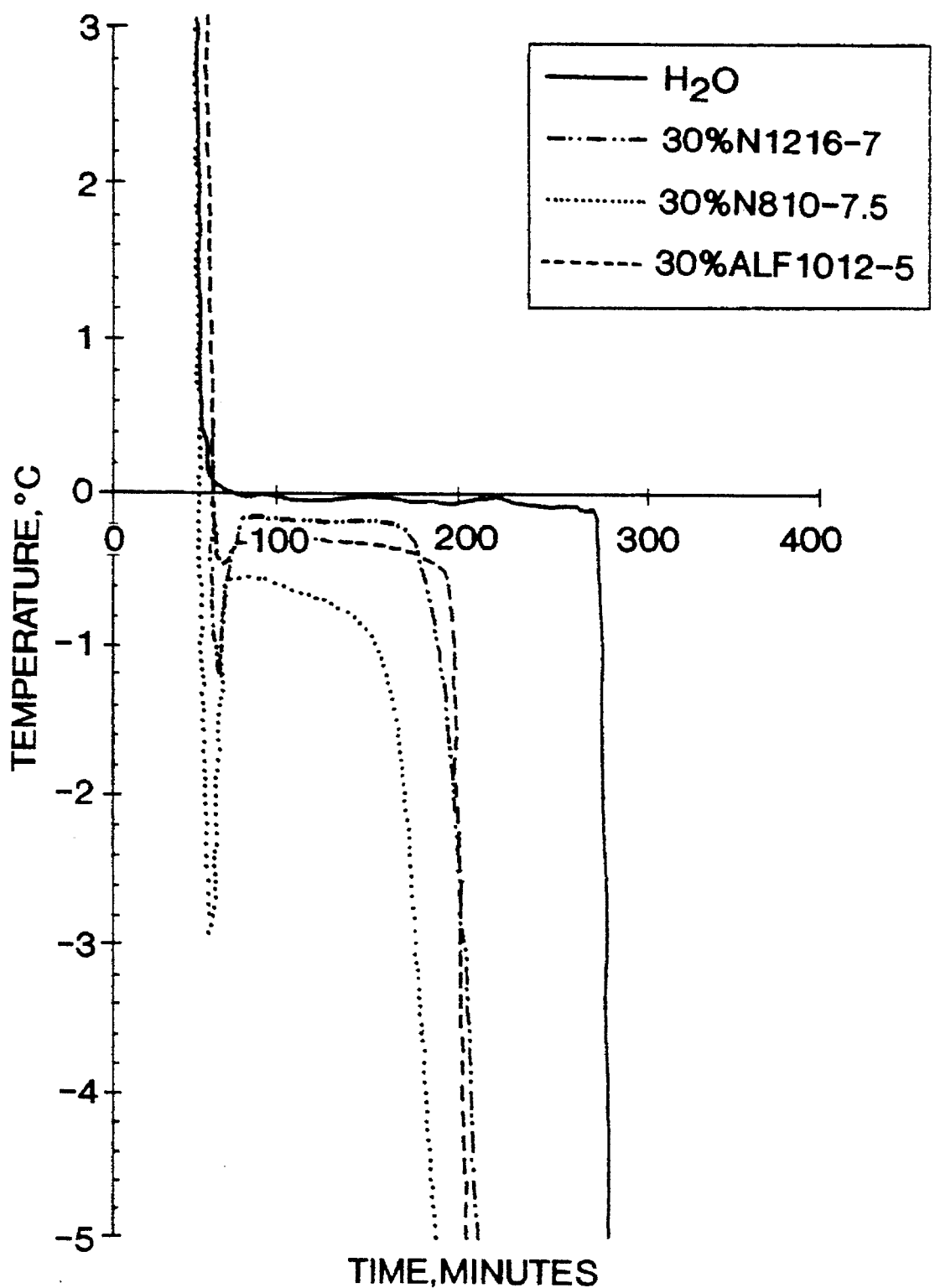
FIG. 4 is a plot of temperature versus time showing three water-based PCMs comprising 30 weight percent ethoxylates, each of the three ethoxylates having a different mixture of alkyl radicals and numbers of ethoxylate groups present in the formulation.

As illustrated in the plot of FIG. 4, three ethoxylate/water solutions were tested against a 100% water standard. High purity alcohol ethoxylates are sold by Vista under the trade name The Novel II surfactants, with Novel II 810-7.5 and Novel II 1216-7 being plotted in FIG. 6. The Novel II 810-7.5 exhibited more freeze depression than the Novel II 1216-7 and Alfonic 1012-5. However, note, the initial dip in temperature for each of the compounds was attributed to supercooling, and was not relative to the freeze depression of the system. Both the Novel II 1216-7 and Alfonic 1012-5 exhibited acceptable freeze plateaus, similar to water with minimal depression in freezing point.

Figure 5:
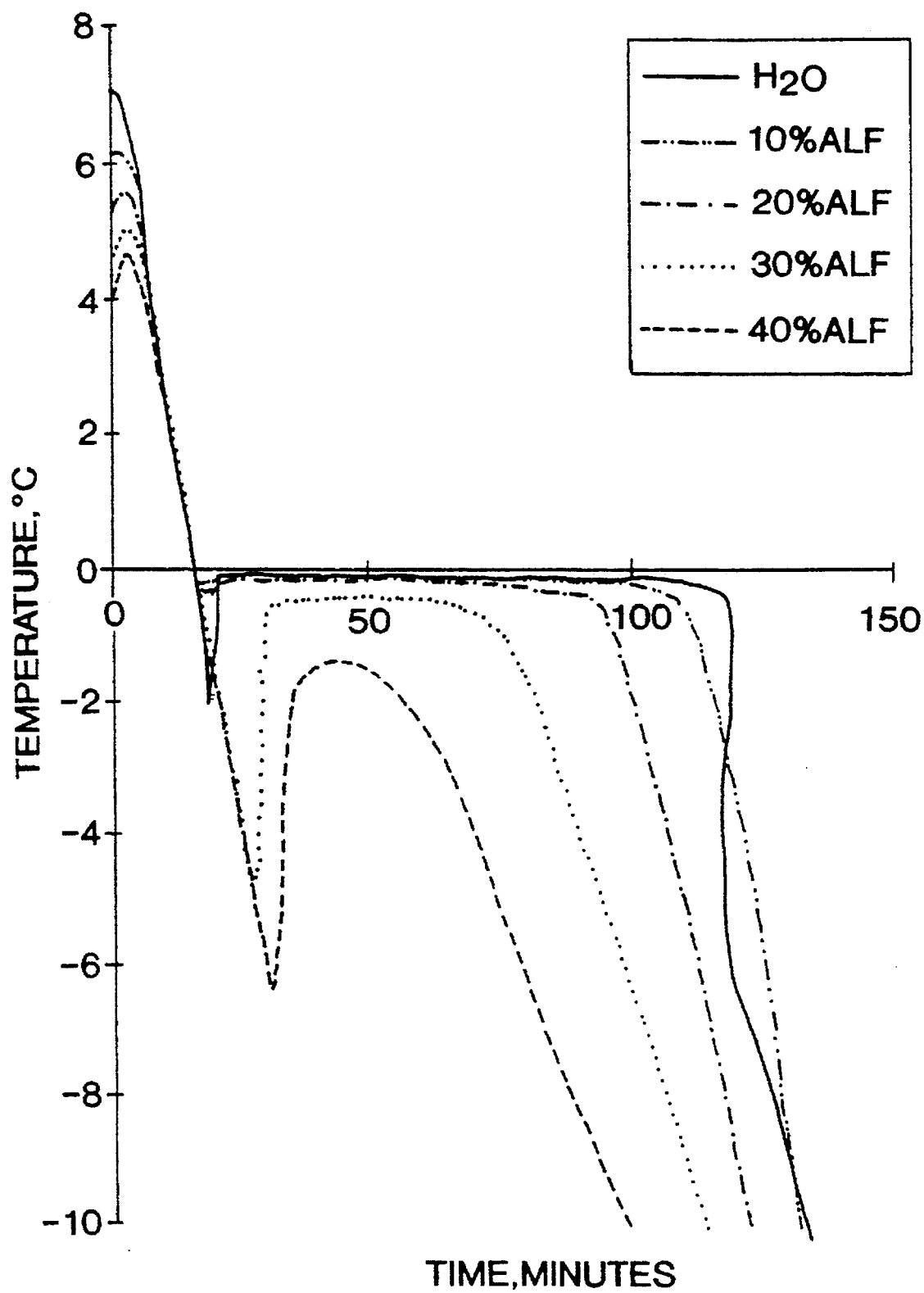
FIG. 5 is a plot of temperature versus time showing a water-based PCM having various weight percentages of $C_{12}$–$C_{16}$ alcohol ethoxylates having about 7.5 ethoxylate groups in accordance with the present invention.

As illustrated in FIG. 5, Alfonic 1216CO-7.5 water solutions were tested at a variety of weight percentages. Note, the energy storage properties of the solution were best when the freezing curve plateau mimics that of water. As shown, the 10% Alfonic demonstrated a freeze plateau closest to water of the four samples with no detectable depression in the freezing point. In fact, the freezing point of water is slightly, if at all, affected up to 30 weight percent of ethoxylate.

EXAMPLE 4

To determine the freeze/thaw and heat stability of the Alfonic 1216CO-7.5, the solutions of Example 1 were subjected to freezing and subsequent thawing. After the thaw, only slight segregation was observed. Additionally cycle testing through four freeze-thaw cycles with no agitation between cycles and room temperature as an upper temperature limit, failed to reveal any changes in the freeze characteristics of the composition.

At elevated temperatures, turbidity was observed in the ethoxylate/water solution which indicated some phase separation. However, the addition of Petro ULF anionic surfactant stabilized the micelles, and when heated to 90° C., and only slightly turbidity was observed. Upon cooling, only a single phase system was visually observed.

EXAMPLE 5

To determine the effect of an anionic surfactant on the heat stability of the PCM, a 30 weight percent solution of Alfonic 1216CO-7.5 in water was prepared using warm water. Ivory soap, manufactured by Proctor & Gamble, was added in the amount of 0.5 g per 100 g of surfactant solution. When heated to 90° C., very slight phase separation occurred, but upon cooling, only a single clear solution was observed. Thus, the presence of the anionic surfactant prevented coalescence at high temperatures.

EXAMPLE 6

To observe volume expansion associated with freezing water, 100 g of water are placed in a 125 ml Erlenmeyer flask (slight conical shape) and placed in a freezer. Upon freezing, the flask broke. This test was repeated 10 times, and each time the expansion of the ice broke the Erlenmeyer flask. However, when ethoxylate/water solutions were frozen under the same or similar conditions, the Erlenmeyer flasks did not break, as demonstrated in Examples 7–9.

EXAMPLE 7

To compare the forces associated with the volume expansion of freezing water with those of an ethoxylate/water solution, three 125 ml Erlenmeyer flasks were filled to contain 100±0.2 g of water. A fourth Erlenmeyer flask contained 100 g of a 20 weight percent Alfonic 1216CO-7.5 in water which included 0.5 g of sodium stearate. The flasks were allowed to freeze overnight in a freezer. In the morning, each of the three flasks containing water were broken. The flask containing the surfactant solution did not break and the solution pushed the surface up into the available head space and formed a slight dome shaped surface.

EXAMPLE 8

To again compare the behavior of freezing ethoxylate/water with that of water, 100 g of water was added to a 125 ml Erlenmeyer flask. Three other flasks each contained 100 g of a 10 weight percent Alfonic 1216CO-7.5 solution. The four flasks were placed in a freezer at −23° C. and allowed to freeze. Upon removal, only the flask containing the water was broken. Each of the flasks containing the surfactant/water solution pushed up through the surface into the available head space in the flask. The frozen mass included a slight domed surface.

EXAMPLE 9

In order to demonstrate the physical differences between ice and frozen water-surfactant solutions, 1 kg of water was added to a bread pan, measuring 5×9 inches and 2.5 inches high. A 1 kg solution containing 10 weight percent Alfonic 1216CO-7.5, 1 weight percent Petro ULF, and 89 weight percent water was added to a second bread pan. Both pans were placed in a freezer overnight. A small fan was also placed in the freezer to ensure a complete freeze of the materials. The next morning, a hammer was used in an attempt to drive a nail into the block of ice. The ice immediately shattered as expected. However, the nail was successfully driven into the ethoxylate/water system without difficulty. The 1 kg mass was picked up using the nail only, demonstrating that the nail was firmly embedded in the mass. This indicated that the frozen surfactant/water system had properties substantially different than those of pure ice.

The frozen ethoxylate/water system is believed to have a discontinuous water phase rather than a continuous particulate phase as seen with water. The melted PCM has a micellar structure of surfactant in water. While one does not wish to be held to any one theory, it is believed that the act of freezing causes phase inversion. Thus, once frozen, the ethoxylate/water system, in essence, becomes solid ice particles dispersed in the organic phase. So, Erlenmeyer flasks don't break and nails can be driven into the solid mass without fracturing the mass.

EXAMPLE 10

Tests were conducted to determine the volume expansion, during freezing of the ethoxylate/water solution. All measurements were made using test tubes which measured 15 cm high and had an internal diameter of 2.2 cm. To make the measurements, stock solutions of the Alfonic 1216CO-7.5/water were prepared by adding the appropriate amount of surfactant to warm water according to Example 1. After thorough mixing with a magnetic stirrer, the solutions were stoppered and allowed to cool. After cooling, a 30 g aliquot of each solution was placed in a respective test tube, and 5 ml of a hydrocarbon solvent was carefully added to the top of each solution.

Once the hydrocarbon was added, care was exercised so that the hydrocarbon would not become dispersed in the ethoxylate/water solution. The height (proportional to volume), in cm, for both the solution and the hydrocarbon, was measured after thoroughly cooling the contents in an ice bath. Then, the test tubes were carefully transferred to a freezer, and, with a thermocouple inserted, cooled to −5° C. to −10° C. When the desired temperature was reached, the height of the hydrocarbon liquid was again measured. The frozen solid produced an indeterminate height for measurement. The difference in the height of the hydrocarbon meniscus, $\Delta h$, before and after freezing, was attributed to volume changes in the material being tested. To calculate the percent change in volume due to freezing the expression, $(H_1+\Delta h/H_1) \times 100-100$ was used, where $H_1$ is the height of the meniscus of the test liquid at 0° C., and $\Delta h$ is the difference in height of the hydrocarbon meniscus before and after freezing.

For each solution, the volume change measurement was made six times, and from these six measurements, both the mean and the standard deviation were calculated. For outlying values, the statistical 2.5 d rule was used to include or exclude individual data points. The results are summarized below.

| SOLUTION COMPOSITION | FREEZE VOLUME EXPANSION IN THE $H_2O$-ALFONIC 1216CO-7.5 SYSTEM | | |
|---|---|---|---|
| | NO. TEST RESULTS USED | % EXPANSION DUE TO FREEZE | STD. DEVIATION |
| Water | 4 | 9.6 | ±9.4 |
| 10% ALFONIC | 5 | 6.7 | 0.5 |
| 20% ALFONIC | 5 | 5.9 | 0.5 |
| 30% ALFONIC | 5 | 4.0 | 0.3 |
| 40% ALFONIC | 5 | 2.5 | 0.3 |
| 100% ALFONIC | 2 | −5.1 | — |

The above data is plotted in FIG. 6. Also plotted is a calculated value for volume expansion in a mixed system assuming no interactions. Although this assumption is not valid, the calculated line and the experimental data show a reasonable fit. The calculated line is from the expression:

$$\% \text{ volume expansion (freeze)} = \{1.09°(\text{wt. \% water}) + 0.949 (\text{wt. \% Alfonic 1216CO-7.5})\} - 100$$

The value, 1.09 for water, is a well known and accepted literature value.

Although the invention has been described in detail with reference to certain preferred embodiments, variations and modifications exist within the scope and spirit of the invention as described and defined in the following claims.

I claim:

1. A thermal energy storage composition for a heat exchanger, said composition comprising
   about 60 to about 91 weight percent water and
   about 9 to about 40 weight percent of a water dispersible non-ionic surfactant,
   said composition capable of freezing to a discontinuous ice phase and significantly maintaining energy storage properties of the water.

2. The composition of claim 1, further comprising about 0.5 to about 1.0 weight percent of an anionic surfactant.

3. The composition of claim 2, wherein the composition remains in a single phase at approximately 90° C.

4. A thermal energy storage composition for a heat exchanger, said composition comprising
   about 60 to about 91 weight percent water and
   about 9 to about 40 weight percent of a water dispersible alcohol ethoxylate,
   said composition capable of freezing to a discontinuous ice phase and significantly maintaining energy storage properties of the water.

5. The composition of claim 4, wherein the alcohol ethoxylate has the formula $R-O-(CH_2CH_2O)_nH$, where R is a linear alkyl radical having from 8 to 16 carbon atoms and n is about 5 to about 8.

6. The composition of claim 5, wherein R is a linear alkyl radical having from about 10 to about 12 carbons and n is about 5.

7. The composition of claim 4, further comprising about 0.5 to about 1.0 weight percent of an anionic surfactant.

8. The composition of claim 7, wherein the anionic surfactant is selected from the group consisting of soap and an alkyl naphthalene sulfonate.

9. A method for reducing rupture failures of a container device during freezing, the container device holding an aqueous phase change composition, said method comprising the step of
   adding to the aqueous phase change composition a water-dispersible non-ionic surfactant in an amount sufficient to promote formation of a discontinuous ice phase upon freezing and to significantly maintain energy storage properties of the water which comprises from about 60 to about 91 weight percent of the composition.

10. The method of claim 9, wherein the non-ionic surfactant comprises an alcohol ethoxylate.

11. The method of claim 10, further comprising the step of adding an anionic surfactant in an amount sufficient to enhance heat stability of the phase change composition.

12. The method of claim 11, wherein the anionic surfactant is selected from the group consisting of a soap and an alkyl naphthalene sulfonate.

13. The method of claim 9, wherein about 9 to about 40 weight percent of a non-ionic surfactant is added to promote formation of a discontinuous ice phase upon freezing.

* * * * *